United States Patent
Genzel et al.

[11] Patent Number: 5,983,152
[45] Date of Patent: Nov. 9, 1999

[54] PROCEDURE FOR CONTROLLING CONTINUOUS VARIABLE TRANSMISSIONS IN MOTOR VEHICLES

[75] Inventors: Michael Genzel, Rosstal; Rodolfo Möller, Nürnberg; Armin Tonn, Roth, all of Germany

[73] Assignee: Temic Telefunken microelectronic GmbH, Heilbronn, Germany

[21] Appl. No.: 08/780,416

[22] Filed: Jan. 8, 1997

[30] Foreign Application Priority Data

Jan. 20, 1996 [DE] Germany .................. 196 02 032

[51] Int. Cl.⁶ .................................................. G06G 7/70
[52] U.S. Cl. .................. 701/51; 477/43; 477/46; 474/18; 474/28
[58] Field of Search ........................ 701/51, 52, 58, 701/61, 54; 477/43, 46, 49, 48, 39; 474/28, 18, 70, 11

[56] References Cited

U.S. PATENT DOCUMENTS

| | | | |
|---|---|---|---|
| 4,852,429 | 8/1989 | Künzer et al. | 701/54 |
| 4,867,732 | 9/1989 | Soga et al. | 477/46 |
| 5,009,127 | 4/1991 | Morimoto et al. | 477/49 |
| 5,052,247 | 10/1991 | Kato et al. | 477/49 |
| 5,156,572 | 10/1992 | Morishige | 474/70 |
| 5,319,999 | 6/1994 | Morishige et al. | 477/46 |
| 5,337,628 | 8/1994 | Hendriks et al. | 477/48 |
| 5,366,416 | 11/1994 | Roovers et al. | 474/18 |
| 5,431,602 | 7/1995 | Hendriks et al. | 474/28 |
| 5,545,105 | 8/1996 | Roovers et al. | 477/43 |
| 5,700,225 | 12/1997 | Roovers et al. | 477/46 |
| 5,707,313 | 1/1998 | Suzuki | 477/43 |

FOREIGN PATENT DOCUMENTS

| | | |
|---|---|---|
| 0697548 | 2/1996 | European Pat. Off. . |
| 2699978 | 7/1994 | France . |
| 06300097 | 10/1994 | Japan . |
| 2220038 | 12/1989 | United Kingdom . |

Primary Examiner—Jacques H. Louis Jacques
Attorney, Agent, or Firm—Venable; Norman N. Kunitz; Catherine M. Voorhees

[57] ABSTRACT

A process for regulating continuously variable transmissions in motor vehicles by means of a controller includes a first control circuit as a speed controller for regulating the transmission input speed as the product calculated from the transmission output speed and the transmission ratio, and a second control circuit post-connected to the first control circuit as a speed gradient controller for regulating the time derivative of the transmission input speed. A correction value, dependent on the functional value of a correcting function and obtained from a correction element, is added to the summation element at the controller input of one of the two control circuits. The correction value is obtained such that the regulating ranges are specified, respectively, with a different control behavior of the controller.

8 Claims, 1 Drawing Sheet

PROCEDURE FOR CONTROLLING CONTINUOUS VARIABLE TRANSMISSIONS IN MOTOR VEHICLES

BACKGROUND OF THE INVENTION

The drive unit of motor vehicles (engine and power transmission train) is increasingly subjected to regulating and control mechanisms in order to optimize the interplay of an engine and its associated transmission; thus, for instance, to reduce fuel consumption in motor vehicles it will be necessary not only to improve engine control systems but also to adapt transmission ratios. To achieve this, automatic transmissions present themselves as a solution, with CVTs (continuously variable transmissions) in particular being increasingly used; this type of transmission allows continuous transmission adjustment until the required transmission ratio has been set. By means of a transmission element (chain, band, belt, etc) located between the discs of two disc assemblies, the required transmission ratio can be continuously adapted: by applying the same contact pressure values on these two disc assemblies—this corresponds to the so-called pretensioning force—the force level for this transmission element will be adjusted; specifying different values for this contact pressure on the two disc assemblies will create an additional transport force component for moving this transmission element; by varying this contact pressure, and thus the transport force, the transmission ratio may be continuously varied in any number of steps.

The regulating processes employed in continuously variable transmissions normally use transmission or speed controllers to effect control. The transmission input or drive speed will be controlled by means of a control circuit designed as a speed controller, this transmission input or drive speed represents the product from transmission output speed, which is proportional to vehicle velocity, or drive speed (disturbance variable), and transmission ratio (control variable); the regulating processes incorporate adaptive strategies to adapt characteristic control fields to the type of driver on the one hand ("long-term strategy: engine performance required by the respective driver"), or to a given environment ("medium-term strategy": for example, slip detection, towing a trailer, climbing a hill), and, finally, to the current driving situation ("short-term strategy": for example, overtaking another vehicle). Furthermore, in order to improve control response, the speed controller can be provided with (post-connected to) a second control circuit of acceleration control type, where the time derivative (gradient) of the transmission input speed represents the controlled variable; that is, in addition to speed control, a speed gradient control will also be effected. The disadvantage of these regulating processes for controlling continuously variable transmissions is that it is not possible to effect (even though this might often be desirable) a control, limitation, or suppression of the control behavior in respect of the control variable transmission ratio, as only the controlled variable transmission input speed is monitored to provide a measure for the transmission ratio: for instance, it is possible that during acceleration or deceleration of the vehicle an unintended change in the transmission ratio, due to the underlying speed gradient control, and thus a change in the transmission settings can occur; in particular, this can lead to an unintentional movement into the so-called mechanical end position of the transmission where strength and/or service life of the transmission element may be detrimentally affected or where the transmission element can be destroyed.

SUMMARY OF THE INVENTION

The object of this invention is to provide a process, for regulating continuously variable transmissions in motor vehicles which allows the control of continuously variable transmissions in motor vehicles to be monitored and/or controlled by simple means.

According to this invention, this task will be solved by a controller comprising a first control circuit as a speed controller for regulating the transmission input speed as the product calculated from the transmission output speed and the transmission ratio, the first control circuit having a first summation element at a first controller input; and a second control circuit post-connected to the first control circuit as a speed gradient controller for regulating the time derivative of the transmission input speed, the second control circuit having a second summation element at a second input of the controller, wherein a correction value which is dependent on a functional value of a correcting function and obtained from a correction element is added to one of the first summation element and the second summation element, and a plurality of correction values are obtained and added such that regulating ranges are formed, each range exhibiting a different control behavior of the controller.

Further advantageous applications and developments of the invention will become apparent from the following description.

In the process presented here—intended for regulating continuous variable transmissions in motor vehicles—, and by means of a modified two-stage controller comprising a speed controller and a subordinated (post-connected) speed gradient controller, control influence on the control variable transmission ratio is monitored as one of the two product factors contained either in the controlled variable transmission input speed (speed controller) or in the controlled variable transmission input speed gradient (speed gradient controller); in particular, depending on specified constraints, control influence on the control variable transmission ratio will be suppressed ("masked out") to a very large extent or even completely in certain regulation ranges, so that within these predefined regulation ranges a change in the transmission ratio (occurring of necessity due to the controlling activity but being unintended and undesirable) is prevented. To this end, a correction value is added to the summation element—at the control input of one of the two control circuits (that is, either the first control circuit for speed control or the second control circuit for speed gradient control). The correction value provides the control deviation as the difference between the current actual value of the returned controlled variable and the nominal value of the controlled variable. Depending on the function value of a correcting function, this correction value will be determined by means of a correction element (for instance, by multiplying the function value of the correcting function with a given factor), where the course of the correcting function can be established or varied in relation to various criteria (for instance, in relation to the current driving situation, vehicle speed, transmission ratio, driver type, control deviation quantity, etc.). The number of regulation ranges set up by adding the correction value to the summation element ("standard" regulation ranges providing unrestricted control, "controlled" regulation ranges providing restricted control, and "transitional" regulation ranges between the "standard" regulation ranges and the "controlled" regulation ranges), and their range limits, can be adapted to the relevant requirements by varying the course of the correcting function or its function values or by varying the correction element. Preferably, five regulating ranges are defined by appropriate selection of the functional action of the correcting function: a controlled regulating range within the minimum value range of the control variable transmission ratio, a controlled regulating range within the maximum value range of the control variable transmission ratio, a standard regulating range within the standard value range of the control variable transmission ratio, and one transitional regulating range respectively between the two controlled regulating ranges and the "standard" regulating range. Furthermore, by appropriate selection of the functional action of the correcting function, the transitional regulating ranges, and thus the transitions from a "standard" regulating range to a "controlled" regulating range can be freely specified—thus, for instance, it is possible to implement either a discontinuous (abrupt) transition or a continuous (smooth) transition between a "standard" regulating range and a "controlled" regulating range.

Advantageously, by specifying different regulating ranges as a result of adding the correction value to the summation element, it will be possible to implement a controlled regulation preventing unintentional and frequently damaging changes in the control variable transmission ratio.

BRIEF DESCRIPTION OF THE DRAWINGS

By means of the drawing, the process for regulating continuous variable transmissions will be illustrated, using the example of an embodiment in the continuously variable transmission (CVT) of a motor vehicle; in this connection.

DESCRIPTION OF A PREFERRED EMBODIMENT

Figure 1:
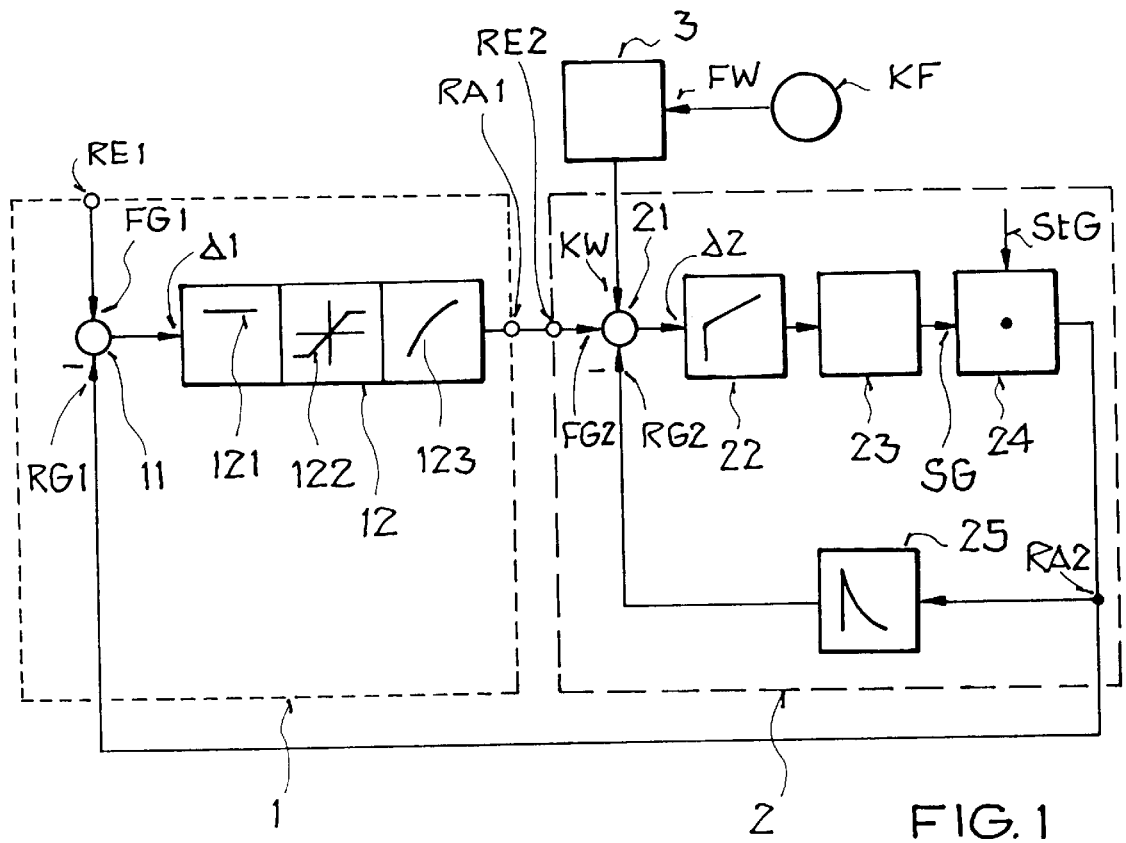
FIG. 1 shows a block diagram of the controller complete with the two control circuits.

According to FIG. 1, the two-stage controller comprises the first control circuit 1 (speed controller) for regulating the transmission input speed $n_{IN}$ as the product $n_{OUT} \cdot \ddot{U}V$ of the transmission output speed $n_{OUT}$ (this is proportional to the actual speed of the motor vehicle) and the transmission ratio $\ddot{U}V$, and the second control circuit 2 (speed gradient controller) post-connected (subordinated) to the first control circuit 1 for regulating the gradient (the time derivative d/dt) of the transmission input speed $n_{IN}$, and the correction element 3 for generating the correction value KW in accordance with the correcting function KF.

The first control circuit 1 features a summation element 11 at the controller input RE1, which is provided—as augend— with the nominal value $n_{IN,DESIRED}$ of the transmission input speed $n_{IN}$ as reference magnitude FG1, and,—as addend— with the actual value $n_{IN,ACTUAL}$ of the transmission input speed $n_{IN}$ as controlled variable RG1. The control deviation $\Delta 1$ ($\Delta 1 = n_{IN,DESIRED} - n_{IN,ACTUAL}$) obtained from calculating the difference between the two quantities $n_{IN,DESIRED}$ and $n_{IN,ACTUAL}$ at the output of summation element 11 will be fed to control element 12—comprising proportional controller 121, limiter 122, and the lowpass filter of the first magnitude 123—at whose output (the controller output RA1) the nominal value $d/dt(n_{IN,DESIRED})$ of gradient d/dt ($n_{IN}$) of the transmission input speed $n_{IN}$ applies.

The second control circuit 2 features a summation element 21 which, at controller input RE2, is connected to controller output RA1 of the first control circuit 1; this summation element 21 is fed, as augend from the first control circuit 1, the nominal value $d/dt(n_{IN,DESIRED})$ of gradient $d/dt(n_{IN})$ of the transmission input speed $n_{IN}$ as reference magnitude FG2, and, as addend, the actual value $d/dt(n_{IN,ACTUAL})$ of gradient $d/dt(n_{IN})$ of the transmission input speed $n_{IN}$ as controlled variable RG2. The control deviation $\Delta 2$ ($\Delta 2 = d/dt(n_{IN,DESIRED}) - d/dt(n_{IN,ACTUAL})$) obtained from calculating the difference between the two quantities $d/dt(n_{IN,DESIRED})$ and $d/dt(n_{IN,ACTUAL})$ at the output of summation element 21 will be fed to the control element 22 designed as a PI controller; via actuator 23, or the controlled system, this control element 22 will preset, as control variable SG, the transmission ratio $\ddot{U}V$. The multiplication element 24 connected to the output of actuator 23 will be fed, as multiplicand, the control variable SG transmission ratio $\ddot{U}V$ and, as multiplier, the transmission output speed $n_{OUT}$ acting as disturbance variable StG; by multiplication of the two values transmission ratio $\ddot{U}V$ and transmission output speed $n_{OUT}$ the actual value $n_{IN,ACTUAL}$ of transmission input speed $n_{IN}$ is obtained. The actual value $n_{IN,IST}$ of transmission input speed $n_{IN}$ at output RA2 of the second control circuit 2 will be fed as controlled variable RG1 to summation element 11 at controller input RE1 of the first control circuit 1 and—via a differential element 25 for calculating the time derivative—as controlled variable RG2 to summation element 21 at controller input RE2 of the second control circuit 2.

Depending on the correcting function KF, the correction element 3 will generate a correction value KW, and this correction value will be added to summation element 21 at controller input RE2 of the second control circuit 2; by appropriate selection of the correcting function KF and the correction element 3, the control behavior of the second control circuit 2 (speed gradient controller) will be influenced such that the influence of the transmission ratio $\ddot{U}V$ on the controlled variable transmission input speed $n_{IN}$ is controlled. By means of the addition of correction value KW to summation element 21, various different regulating ranges featuring varying control behavior characteristics are set up whose number and range limits as well as the transitions between the various regulating ranges may be varied by suitable selection of the functional action of correcting function KF. Thus, for instance, the correction value KW supplied by addition to summation element 21 of the second control circuit 2 is formed by correction element 3, multiplying the function value FW of correcting function KF—which value depends on the transmission ratio $\ddot{U}V$—with the factor $\ddot{U}V \cdot d/dt(n_{OUT})$; for this reason, the following holds for the control deviation $\Delta 2$ resulting at the output of summation element 21 of the second control circuit 2:

$$\Delta 2 = d/dt(n_{IN,DESIRED}) - d/dt(n_{IN,ACTUAL}) + KW = d/dt(n_{IN,DESIRED}) - d/dt(\ddot{U}V) \cdot n_{OUT} - \ddot{U}V \cdot d/dt_{OUT} + FW \cdot \ddot{U}V \cdot d/dt(n_{out}) \quad (1)$$

As can be seen from equation (1), the influence of factor $\ddot{U}V \cdot d/dt(n_{OUT})$ can be controlled by means of the correcting value KW, that is the presetting of the transmission ratio $\ddot{U}V$ as a result of the regulation can be influenced via this correction value KW (for instance, it is possible to keep the value of the transmission ratio $\ddot{U}V$ constant, although it would really need to be varied according to the regulation).

This is to be explained using the example of the transient state of the regulation: in this transient state, nominal value and actual value of transmission input speed $n_{IN}$ (control circuit 1) as well as gradient d/dt of transmission input speed $n_{IN}$ (control circuit 2) are equal so that the control deviation $\Delta 1$—and thus also the proportion $d/dt(n_{IN,SOLL})$ at controller output 12 of control circuit 1—and control deviation $\Delta 2$ will be zero; in this case, equation (1) yields the following:

$$0 = 0 - d/dt(\ddot{U}V) \cdot n_{OUT} - \ddot{U}V \cdot d/dt_{OUT} + FW \cdot \ddot{U}V \cdot d/dt(n_{out}) \quad (2)$$

$$d/dt(\ddot{U}V) \cdot n_{OUT} = -\ddot{U}V \cdot d/dt_{OUT} + FW \cdot \ddot{U}V \cdot d/dt(n_{out}) \quad (3)$$

If the motor vehicle accelerates or decelerates in the transient regulation state (when moving off, for instance), the term $\ddot{U}V \cdot d/dt_{OUT}$ in equation (2)—which is dependent on the time derivative of the vehicle speed (acceleration)—will not be zero ($n_{OUT}$ is proportional to the actual velocity) so that the term $d/dt(\ddot{U}V) \cdot n_{OUT}$ in equation (3) would also need to have a value other than zero, that is the transmission ratio $\ddot{U}V$ would inevitably be altered due to the effect of the regulation. This can be prevented by forcing a balanced state onto the regulation by means of the additive correction quantity $FW \cdot \ddot{U}V \cdot d/dt(n_{out})$ in equation (3), which is dependent on the function value FW of the correcting function KF.

Figure 2:
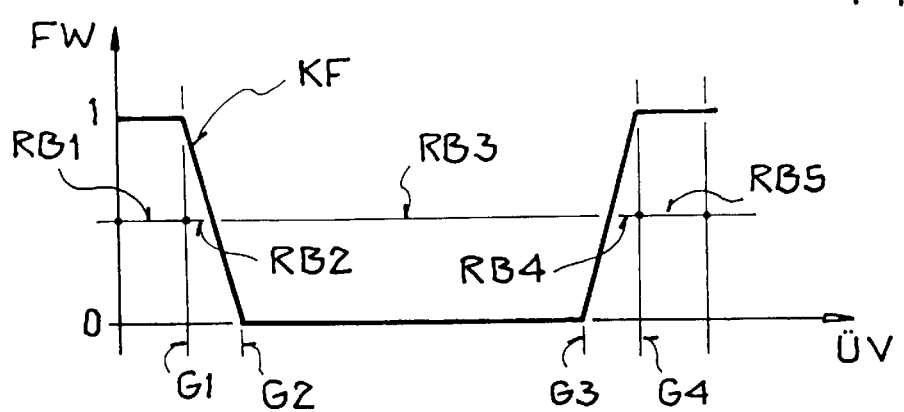
FIG. 2 shows an example for the functional action of the correcting function.

By way of example, FIG. 2 shows the course of correcting function KF with the function value FW as a function of the transmission ratio $\ddot{U}V$.

Due to the course of the correcting function KF preselected there, five regulating ranges RB1, RB2, RB3, RB4, RB5 will be defined which are separated from each other by the limiting values G1, G2, G3, G4 as range limits, and which each feature a different control behavior; thus, for instance, the first regulating range RB1 extends from transmission ratio $\ddot{U}V=0.3$ to transmission ratio $\ddot{U}V=0.4$ (limiting value G1); the second regulating range RB2, as a transitional range, extends from transmission ratio $\ddot{U}V=0.4$ (limiting value G1) to transmission ratio $\ddot{U}V=0.6$ (limiting value G2); the third regulating range RB3 extends from transmission ratio $\ddot{U}V=0.6$ (limiting value G2) to transmission ratio $\ddot{U}V=2.0$ (limiting value G3); the fourth regulating range RB4, as a transitional range, extends from transmission ratio $\ddot{U}V=2.0$ (limiting value G3) to transmission ratio $\ddot{U}V=2.2$ (limiting value G2); and the fifth regulating range RB5 extends from transmission ratio $\ddot{U}V=2.2$ (limiting value G4) to the maximum transmission ratio $\ddot{U}V=2.4$. In the third regulating range RB3, the function value FW of correcting function KF is zero (FW=0); this means that the correction value fed to the summation element 21 of control circuit 2 (speed gradient controller) KW is also zero (KW=0), that is within the third regulating range RB3 control circuit 2 and thus the entire controller will effect a "standard" control.

In the first regulating range RB1 as well as in the fifth regulating range RB5, the function value FW of correcting function KF, and thus also the correction value KW fed to the summation element 21 of control circuit 2 (speed gradient controller) will be constant and other than zero; for instance, the function value FW will be FW=1 in the first regulating range RB1 as well as in the fifth regulating range RB5, so that—for correction value KW—the value KW= $\ddot{U}V \cdot d/dt(n_{out})$ is obtained. According to equation (2), this correction quantity exactly compensates the proportion $d/dt(\ddot{U}V) \cdot n_{OUT}$; this means that the transmission ratio $\ddot{U}V$ will neither change any more nor be able to be influenced by motor vehicle acceleration or deceleration.

The two transitional ranges—second regulating range RB2 and fourth regulating range RB4—the transition behavior between the regulating ranges RB1 and RB3 or RB3 and RB5 will be determined; according to the correction function KF shown in FIG. 2, the transition occurs almost discontinuously (stepped) due to the second regulating range RB2 and the fourth regulating range RB4 being relatively narrow; this will quickly alter the function value FW of correcting function KF between the limiting values G1 and G2 or the limiting values G3 and G4.

For other embodiments or limiting conditions, the functional action of correcting function KF, and thus the presetting of the various different regulating ranges RB1, RB2, RB3, RB4, RB5 (functional action, extent, transitions) can be adapted or varied appropriately.

What is claimed is:

1. A process for regulating continuously variable transmissions in motor vehicles by means of a controller comprising a first control circuit having a first controller input and serving as a speed controller for regulating the transmission input speed as the product calculated from the transmission output speed and the transmission ratio, the first circuit control having a first summation element at the first controller input, and a second control circuit post-connected to the first control circuit having a second controller input and serving as a speed gradient controller for regulating the time derivative of the transmission input speed, the second control circuit having a summation element at the second controller input, the process comprises the steps of:

monitoring a control variable transmission ratio of the first controller input and the second controller input;

obtaining a correction value dependent on a functional value of a correcting function from a correction element;

adding the correction value to one of the first summation element and the second summation element to form a regulating range; and using the correction value to control the variable transmission, wherein a plurality of correction values are obtained and each obtained correction value specifies a regulating range exhibiting a different control behavior of the controller.

2. A process according to claim 1 wherein the number, range limits, and control behavior of the regulating ranges are specified in accordance with parameters or limiting conditions which depend on the operating conditions of the motor vehicle.

3. A process according to claim 2 wherein the number, range limits, and control behavior of the regulating ranges are specified in accordance with at least one the respective driving situation of the motor vehicle, current vehicle speed, current transmission ratio, driver type, and the actual value of the control deviation.

4. A process according to claim 1 wherein the step of obtaining the correction value includes presetting the following regulating ranges:

at least one standard regulating range within which controller action will not be influenced in any way, at least one controlled regulating range within which controller action will be influenced, and a transitional range between a controlled regulating range and a standard regulating range.

5. A process according to claim 4 wherein the regulation effect on the control variable transmission ratio will at least be suppressed to a very large extent within the controlled regulating range.

6. A process according to claim 5 wherein the regulation effect on the control variable transmission ratio will be completely suppressed within the at least one controlled regulating ranges.

7. A process according to claim 4 wherein the transitional range will be selected such that the transition between the at least one controlled regulating range and the at least one standard regulating range is effected abruptly.

8. A process according to claim 4 wherein the transitional range will be selected such that the transition between the at least one controlled regulating range and the at least one standard regulating range is effected continuously.

* * * * *